United States Patent [19]

Beentjes

[11] 4,214,735

[45] Jul. 29, 1980

[54] PRESSURE MEASUREMENT IN A HOOD ABOVE A CONVERTER FOR MANUFACTURING STEEL

[75] Inventor: Nicolaas H. M. Beentjes, Uitgeest, Netherlands

[73] Assignee: Hoogovens IJmuiden, B.V., IJmuiden, Netherlands

[21] Appl. No.: 938,908

[22] Filed: Sep. 1, 1978

[51] Int. Cl.² .............................................. C21C 5/42
[52] U.S. Cl. ...................................... 266/99; 266/89; 266/158
[58] Field of Search ................. 75/60, 115 R; 266/89, 266/99, 158

[56] References Cited

U.S. PATENT DOCUMENTS

| | | | |
|---|---|---|---|
| 3,338,839 | 8/1967 | Maehara | 75/60 |
| 3,494,763 | 2/1970 | Kato | 75/60 |
| 3,599,949 | 8/1971 | Grenfell | 75/60 |

FOREIGN PATENT DOCUMENTS 1041602  9/1966  United Kingdom .................. 75/60

Primary Examiner—P. D. Rosenberg
Attorney, Agent, or Firm—Stevens, Davis, Miller & Mosher

[57] ABSTRACT

Apparatus for manufacturing steel includes a hood adapted to be connected to the mouth of a converter. The hood has at least one conduit opening into it for introducing secondary materials into the hood. In order to arrange monitoring points of the pressure within the hood cheaply and conveniently, the pressure-measuring points are incorporated into the upper sides of the conduits. Each conduit may also have a connection which enables it to be flushed out with an inert gas, thus preventing a dangerous build up of inflammable gases within the conduit.

4 Claims, 2 Drawing Figures

PRESSURE MEASUREMENT IN A HOOD ABOVE A CONVERTER FOR MANUFACTURING STEEL

BACKGROUND OF THE INVENTION

1. Field of the Invention

The present invention relates to a hood for connection to the mouth of a steelmaking converter, and more particularly to a hood which incorporates one or more pressure-measuring points.

2. Description of the Prior Art

A conventional method of producing steel in a converter uses a hood adapted to be connected to the mouth of the converter. In this way secondary combustion of inflammable gases released during the steelmaking process can be prevented. The secondary combustion takes place above the converter and in the hood as a result of the entry of surrounding air. In this process therefore, it is very important to be able to measure accurately the gas pressure in the hood. It should be noted that the pressures concerned are of the order of a 1 mm column of water and that the control effected by an exhaust fan connected to the hood has to be based on the pressure measured in the hood.

It is common practice to incorporate several measuring points into the wall of the hood for this purpose. These measuring points consist of pressure meters fitted in water-cooled tubes. The pressure meters are inserted in the water-cooled wall of the hood. The provision of pressure-measuring points increases the complexity of the hood construction and hence increases investment costs. However, one of the main drawbacks of the known construction is that these measuring points often become contaminated by materials originating from the reaction gases. Additionally, in order to achieve reliable pressure measurements it is usually necessary to fit at least three or four measuring points and also to clean those periodically. Special reaming devices have been developed for this purpose. The disadvantages mentioned lead to high maintenance costs, and the pressure measurements produced still leave much to be desired.

SUMMARY OF THE INVENTION

It is an object of the present invention to overcome the problems discussed above in pressure-measurement in conventional hoods, and to achieve a substantial reduction in investment costs and particularly in equipment maintenance costs.

To this end, the invention proposes that the measuring point is fitted in the top side of a conduit or similar conduit for introducing secondary materials, which conduit opens angularly into the hood. These pressure-measuring points can be respectively fitted in several delivery conduits or similar conduits if required.

In a preferred embodiment of the present invention, each delivery conduit has a connection which enables it to be flushed out with an inert gas. This measure is to prevent a build-up of inflammable gases occurring in the conduit. Such a build-up could give rise to explosions.

Very reliable pressure measurements can be achieved with one, or at most two measuring points of the invention fitted to the conduits already present in the hood. It is therefore unnecessary to provide additional fittings for complex measuring points in the hood wall itself. Surprisingly, it has been found that these measuring points do not become contaminated, and therefore maintenance costs and investment in maintenance equipment are totally avoided. This is surprising because the secondary material passing down the conduits could be expected to contaminate the measuring points. However, this is not so, firstly because the conduits are too wide to become blocked by particles originating from the reaction gases, and secondly because the secondary material itself periodically cleans the conduits and also the measuring points as it flows through.

An incidental advantage of embodiments of the present invention is that the measuring points are less exposed to heat radiated from the converter and the hood than previously. This considerably prolongs the life of the measuring points.

BRIEF DESCRIPTION OF THE DRAWING

An embodiment of the present invention will now be described by way of example with reference to the accompanying drawing, in which.

DESCRIPTION OF THE PREFERRED EMBODIMENT

Figure 1:
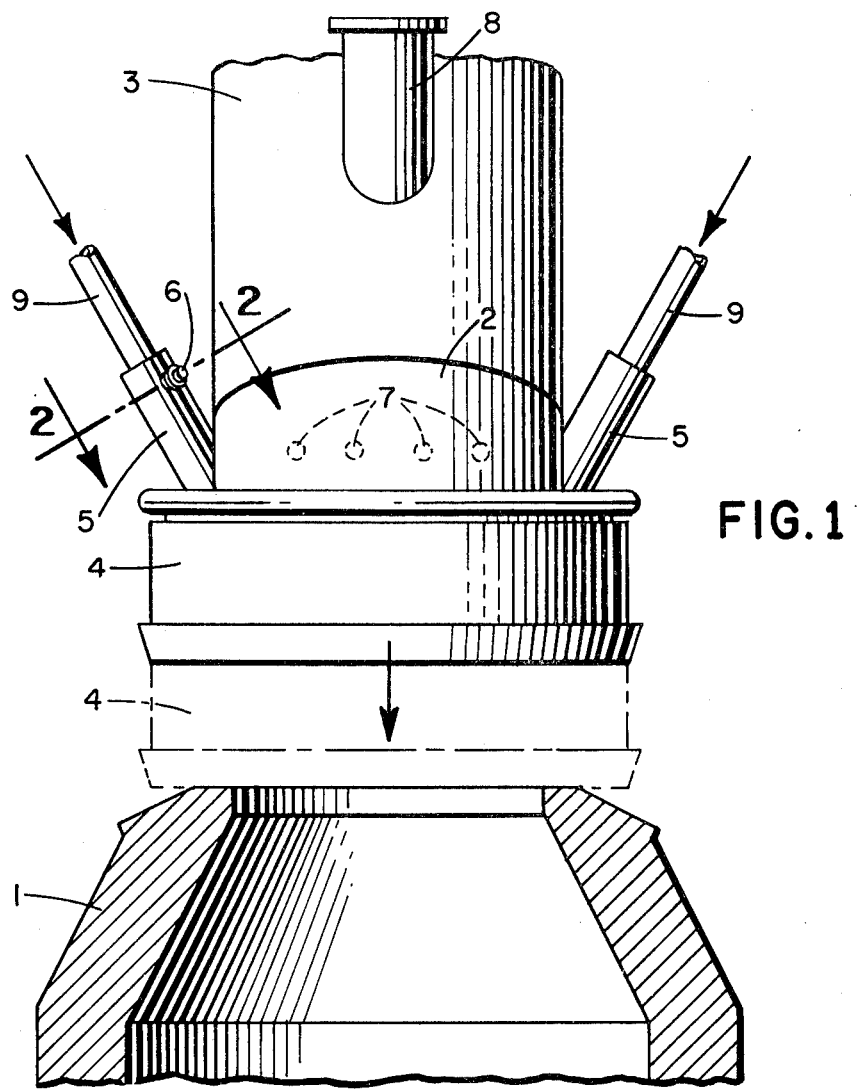
FIG. 1 is a side elevation (with the converter shown in section) of an installation embodying the invention and with the skirt shown in its lowered position in phantom lines.

In FIG. 1 a converter 1 for producing steel has a hood fitted above it. The hood has a vertical portion 2 and a portion 3 at an angle to the portion 2. A movable skirt 4 can be moved relatively to the vertical portion 2 into engagement with the mouth of the converter 1. Two delivery conduits 5 open into the vertical portion 2 of the hood. The chutes 5 are for supplying secondary materials to the converter 1.

FIG. 1 also shows the conventional locations 7 of a number of measuring points shown in phantom lines for measuring the ambient gas pressure inside the hood. However in the present vessel, which embodies the invention, these measuring points are omitted. A dome 8 is attached to the rearwardly sloping portion 3 of the hood along the longitudinal axis common to the converter 1 and the vertical portion of the hood 2. This dome permits the introduction of an oxygen lance into the converter 1.

Figure 2:
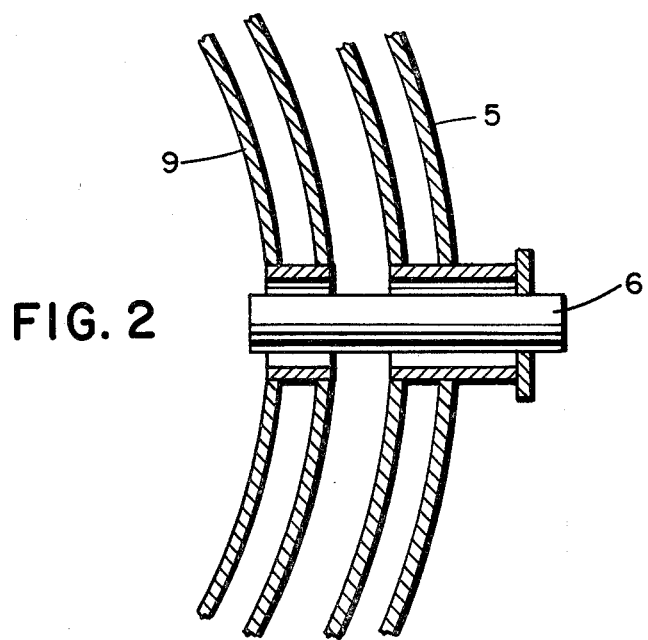
FIG. 2 is a sectional view of a secondary materials input conduit taken on line 2—2 of FIG. 1.

FIG. 2 shows a cross section of one of the delivery conduits 5. The chute 5 comprises two water-cooled, double-walled elements, of which the outer element 5 forms a part of the hood wall cooling circuit pipe-system. Inside the conduit 5 is a second double-walled water-cooled element 9 through which secondary material is introduced. A pressure measuring element 6 of the invention penetrates the two double-walled, water-cooled wall pipes 5 and 9 near the upper end of the pipe 5. A similar measuring element can be fitted in a symmetrical place in other delivery conduits if required. It has been found that by positioning a pressure measuring element 6 in the place shown according to the invention, the measuring element 6 is not exposed to contamination and therefore no maintenance costs are incurred. Also, this system results in very reliable pressure measurements achieved with this arrangement.

What is claimed is:

1. In an apparatus for manufacturing steel comprising a converter, a vertical hood adapted to be connected to the mouth of the converter, at least one pressure-measuring point for determining the pressure within the hood, and at least one conduit opening downwardly in a non-vertical position into said hood for introducing secondary materials into the converter, the improvement whereby the said measuring point is located in the upper side of the said conduit.

2. Apparatus according to claim 1 wherein a connection is provided in said conduit enabling it to be flushed out with an inert gas.

3. Apparatus according to claim 1 or claim 2, wherein a plurality of said pressure-measuring points are located respectively in a plurality of said conduits.

4. A hood in the form of a vessel adapted to be connected to the mouth of a steelmaking converter, said hood having a plurality of pipes opening into the interior of the hood for delivery into the converter of secondary materials, the pipes extending downwardly and inclined to the hood wall thereby constituting chutes for the secondary material, and a plurality of pressure-measuring means for measuring the pressure within the hood, located each at the top side of one of the said pipes and penetrating through the pipe wall into the interior so as to sense the pressure within the pipe.

* * * * *